UNITED STATES PATENT OFFICE.

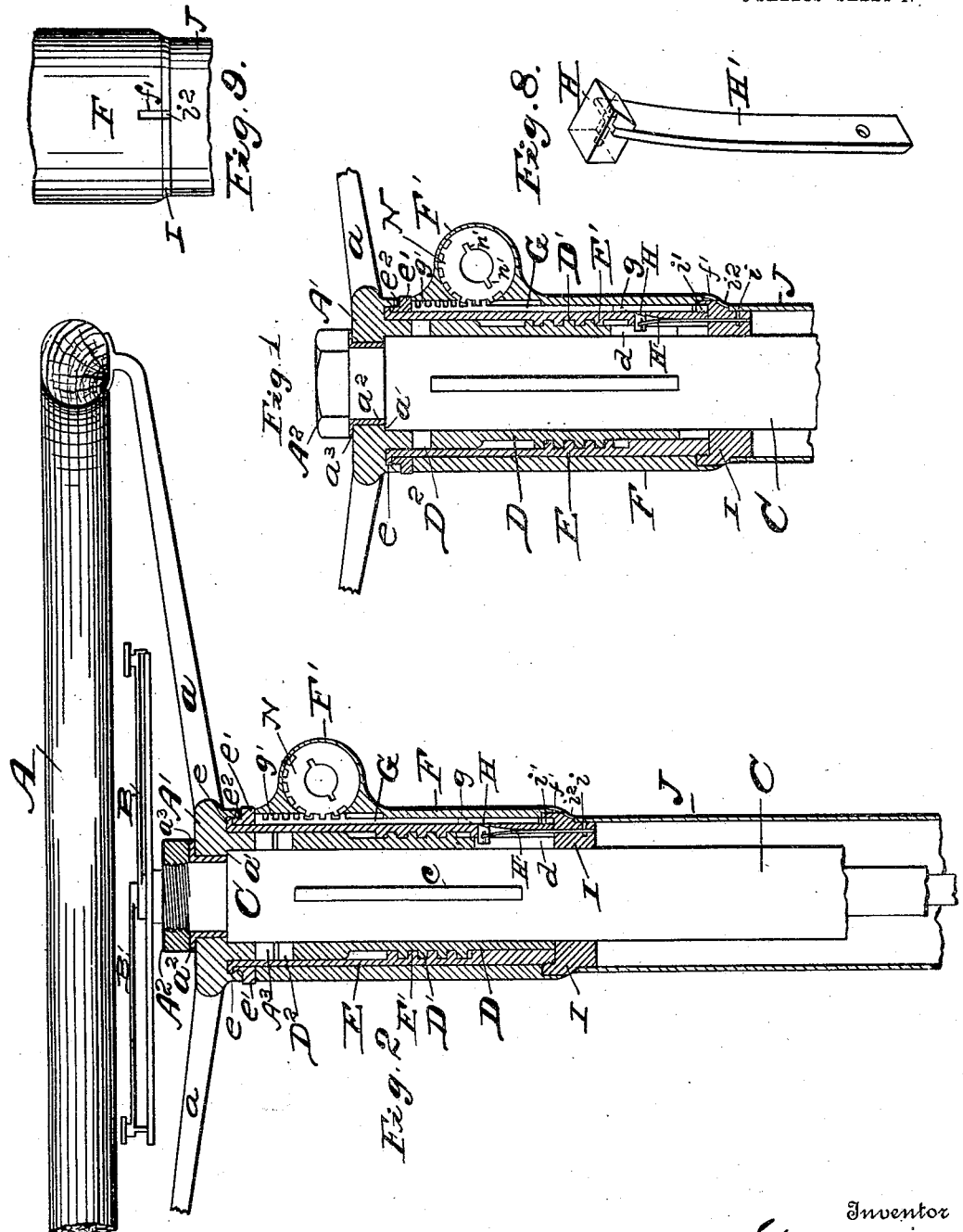

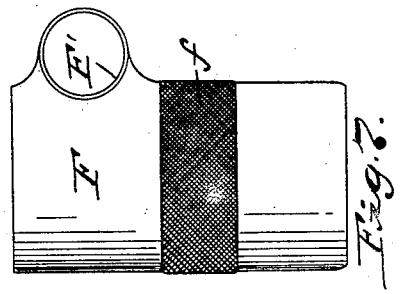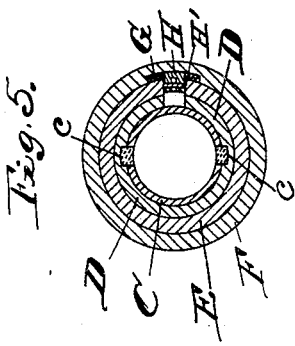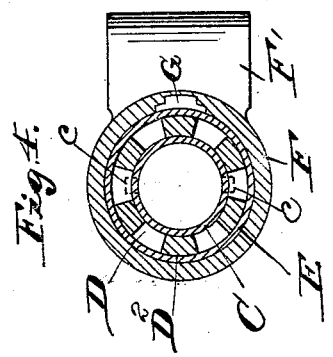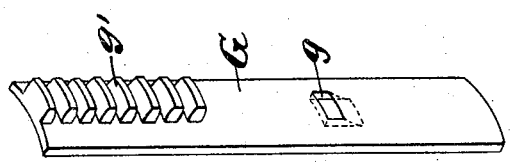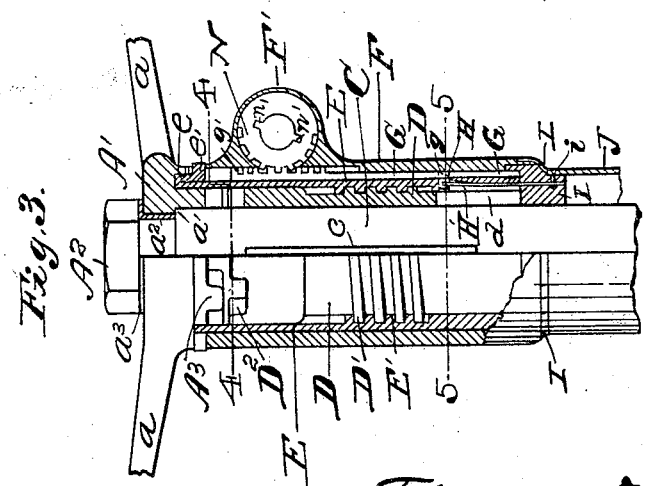

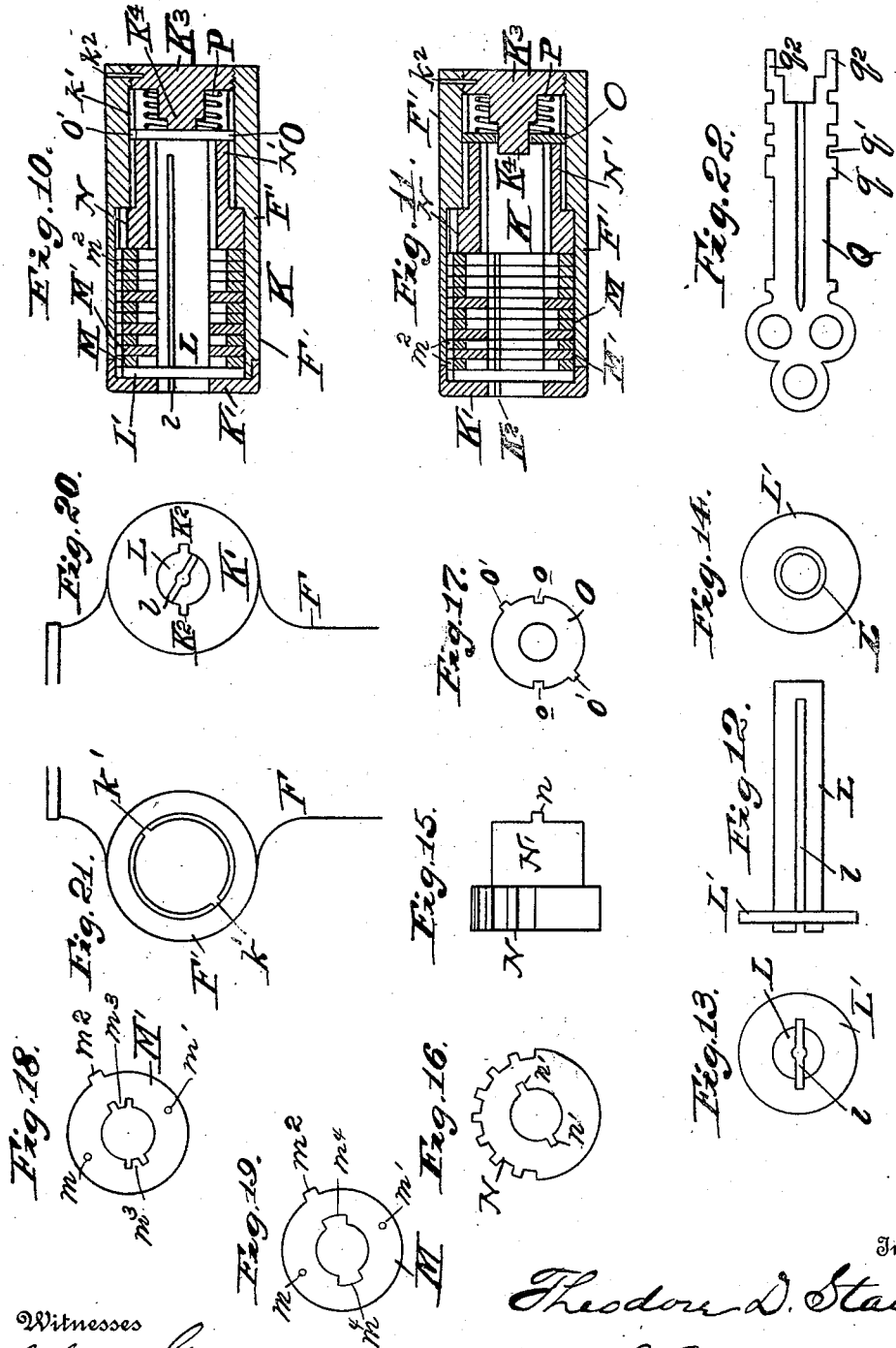

THEODORE D. STANLEY, OF DETROIT, MICHIGAN.

LOCK FOR STEERING-WHEELS.

1,017,335.  Specification of Letters Patent.  Patented Feb. 13, 1912.

Application filed June 5, 1911. Serial No. 631,447.

*To all whom it may concern:*

Be it known that I, THEODORE D. STANLEY, citizen of the United States, residing at Detroit, county of Wayne, State of Michigan, have invented a certain new and useful Improvement in Locks for Steering-Wheels, and declare the following to be a full, clear, and exact description of the same, such as will enable others skilled in the art to which it pertains to make and use the same, reference being had to the accompanying drawings, which form a part of this specification.

My invention relates to an improvement in locks for steering wheels, being especially designed for steering wheels in which the controlling mechanism governing the supply of gasolene and the ignition system is housed within the post, in contradistinction to steering wheels provided with an "outside control" in which the operating mechanism is located outside of the steering post. In my patent dated February 28th, 1911, No. 985,468, is shown a locking device for steering wheels employing the latter mechanism.

One of the objects of the present invention is to provide means whereby the steering wheel of an automobile fitted with "inside controlling mechanism," may be temporarily thrown out of operative relation with the steering post,—the purpose being to release the steering wheel from operative control of the post when the owner leaves the automobile that it may not be driven by an unauthorized person.

In the drawings accompanying this specification:—Figure 1 is a vertical sectional view through the wheel and steering post with parts broken away and in elevation, showing the wheel in locked relation with the post. Fig. 2 is a similar view showing the wheel released from operative control of the post,—the locking mechanism being returned to the position indicated in Fig. 1, that the key employed to operate the mechanism may be withdrawn from the lock. Fig. 3 is a vertical section partly in elevation, showing the locking bolt thrown by the operation of the key actuated pinion, to the position occupied when the parts are in condition for releasing or coupling the wheel with the post through the rotation of the screw-threaded coupling sleeve shown partly in section and partly in elevation,—the view being divided along a central vertical line parallel with the axis of the post. Fig. 4 is a cross-sectional view on line 4—4 of Fig. 3. Fig. 5 is a cross-sectional view on line 5—5 of Fig. 3. Fig. 6 is a perspective view of the locking bolt. Fig. 7 is an elevation of the milled outer sleeve. Fig. 8 is a perspective view of the spring latch co-acting with the locking bolt to lock the outer milled sleeve with the coupling sleeve. Fig. 9 is a fragmentary detail view of the outer milled sleeve and the tubular jacket surrounding the post, showing the registering indentations whereby the owner determines when the respective parts are in position for the operation of the bolt shown in Fig. 6. Fig. 10 is a longitudinal sectional view through the lock. Fig. 11 is a similar view of the lock with the core removed. Fig. 12 is a side elevation of the core. Fig. 13 is an end elevation of the core. Fig. 14 is an elevation of the opposite end of the core. Fig. 15 is a side elevation of the pinion for actuating the bolt shown in Fig. 6. Fig. 16 is an end elevation of the pinion. Fig. 17 is an elevation of the disk abutting the hub end of the pinion. Figs. 18 and 19 are detail views of the wards. Fig. 20 is a fragmentary detail of the outer sleeve, showing the key entering end of the lock. Fig. 21 is a like fragmentary view of the opposite side of the sleeve, the end plug and lock being removed. Fig. 22 is an elevation of the key.

Referring now to the letters of reference placed upon the drawings:—A is the steering wheel, and A' the hub of the wheel provided with the usual radiating spokes $a$ to which the wheel is secured.

B and B' denote the levers of the controlling mechanism,—certain parts of which are inclosed within the tubular steering post C. The hub A' of the steering wheel is provided with a shoulder $a'$ resting upon the shoulder formed in the steering post, thereby coöperating in the support of the parts upon the end of the post.

$a^2$ is a thimble fitted in the bore of the hub and sleeved over the post, provided with a projecting flange $a^3$ against which the nut $A^2$, threaded to the steering post is brought to bear,—the flange portion of the thimble being interposed between the hub and the nut to permit the wheel to turn freely on the post while being secured thereon by the nut. The hub A' is provided with a depending notched flange $A^3$ co-acting with the notched edge $D^2$ of the screw threaded coupling sleeve D to form a clutch. The coupling sleeve D while free to reciprocate on the steering post is held against rotation thereon by the splines or feathers $c, c$, projecting from the steering post into grooves in the coupling sleeve D.

E is a thimble fitted over the coupling sleeve having an internal screw-thread $E'$ co-acting with the screw-thread $D'$ of the coupling sleeve. The thimble E at the top is provided with a projecting flange $e$ against which the nut $e'$ having a screw-threaded engagement with the hub of the wheel, bears; thereby securing the thimble to the hub, it being free to turn with respect thereto.

$e^2$ is a pin set in the hub to lock the nut against accidental release.

F is a sleeve fitted over the thimble E, provided with a milled band $f$ for convenience in manually rotating it, the part being referred to throughout this description as the "milled sleeve."

$F'$ is an annular housing at right angles to the body of the sleeve forming the barrel of a lock.

G is a reciprocating bolt fitted in a groove formed in the milled sleeve F.

$g$ is an aperture provided in the bolt adapted to receive the latch H mounted on the end of a spring $H'$, in turn supported in the hub I, to which it is secured by a pin $i$. The hub I is sleeved on the steering post C and has a screw-threaded engagement with the thimble E.

J is a tubular jacket inclosing the steering post.

$i'$ is a recess formed in the hub I to receive the end of the bolt G when the latter is thrown downward to the limit of its movement in position to receive the latch H in the aperture $g$ formed in the bolt.

$d$ is a slot in the coupling sleeve to receive the opposite end of the latch H when forced back in the position indicated in Figs. 1 and 2 of the drawings.

K is a lock fitted in the barrel or housing $F'$, formed in the milled sleeve. The barrel of the lock is provided at the key receiving end with an annular cap $K'$ having oppositely disposed notches $K^2$ designed to register with the key receiving slot $l$ of the rotatable core L fitted therein.

$L'$ is a disk secured to one end of the core and directly back of the annular cap $K'$.

M and $M'$ denote a plurality of wards, shown in detail in Figs. 18 and 19, sleeved over the core L,—the wards being grouped in any desired order upon the core and secured together to form a single unit by pins set in the apertures $m$ and $m'$.

$m^2$ are lugs projecting from the periphery of the wards into a groove provided for their reception in the wall of the barrel, the purpose being to secure the wards against rotation.

N is a pinion, preferably of mutilated form, shown in Fig. 16, housed within the barrel of the lock,—the teeth of the pinion meshing with the rack $g'$ on the bolt G. The hub end $N'$ of the pinion N is provided with projecting ears $n$ adapted to enter notches $o$ in the periphery of the abutting annular disk O. $O'$ are lugs on the disk O which project into grooves $k'$ in the lock barrel.

$K^3$ is a closure plug for the end of the lock barrel, screw-threaded for engagement therewith. $k^2$ is a pin to secure the same when in position. The closure plug $K^3$ is provided with an inwardly projecting stem $K^4$ over which the annular disk O is sleeved.

P is a coiled spring supported upon the stem $K^4$,—one end of which bears against the closure plug and the other against the annular disk to force the latter into a locked relation with the hub of the pinion N.

Q is a key for operating the pinion and is provided with projections $q$ and notches $q'$ to adapt it to fit the lugs $m^3$ and the notches $m^4$ of the several wards.

Having thus indicated the several parts by reference letters, the construction and operation of the device will be readily understood.

It will be assumed that the steering wheel is in locked relation to the steering post as indicated in Fig. 1 of the drawings, and that the owner of the car being about to leave his machine desires to release the steering wheel from the post and to lock it in a released position that the automobile may not be operated by any unauthorized person during his absence. The key is first inserted in the receiving slot of the core and turned slightly so that it may pass the several projecting lugs of the wards until it registers with the grooves $n', n'$, of the pinion N into which it is thrust continuing its passage until the projecting ends $q^2$ of the key bear against the abutting disk O, forcing the latter backward against the action of the spring P, until the lugs $n$ on the hub of the pinion N, are released from engagement with the notches $o$ of the abutting disk. The pinion is then free to rotate and is actuated by turning the key. The teeth of the pinion meshing with the rack bar of the bolt G, forces the bolt downward upon the rotation of the pinion,—the lower end of the bolt entering the recess $i'$ formed in the annular hub I.

Upon the bolt reaching the limit of its movement, as indicated in Fig. 3, the aperture $g$ therein will register with the latch H, the latter through the action of the spring $H'$, enters the aperture coöperating in locking the milled sleeve F with the thimble E. By manually rotating the milled sleeve F, the thimble E, through its internal screw $E'$ meshing with the screw $D'$ of the coupling sleeve, will withdraw the notched portion D² from its interlocking relation with the notched portion A³ of the hub A'. To release the key from the lock and to secure the parts in their unlocked relation until returned to their initial position by an authorized person, the key is given a reverse movement in order that it may pass the several wards of the lock and be withdrawn. This action reverses the pinion and by it the bolt G is returned to its initial position leaving the coupling sleeve unlocked from the hub as indicated in Fig. 2. The bolt G can be returned only when the latch H is opposite the slot $d$ of the coupling sleeve, therefore the milled sleeve F must first be adjusted so that the kerf $f'$ of the sleeve will register with the kerf $i^2$ of the hub I. This insures a full locked or unlocked relation (as the case may be) of the coupling members before the bolt may be actuated. The bolt G in returning forces the latch H back into the slot $d$ of the coupling sleeve locking the sleeve and thimble E against further operation until again released. The bolt G being withdrawn from the recess $i'$ of the hub I, the milled sleeve F is free to turn around the steering post without danger of actuating the coupling sleeve. To return the steering wheel to its locked relation with the post, the milled sleeve is first turned until the kerfs $f'$ and $i^2$ register as before explained. The key Q is then thrust into the lock and the bolt G thrown into the position occupied in Fig. 3. The milled sleeve F is then rotated until the coupling sleeve is again brought into locking relation with the notched hub A' of the steering wheel. The bolt G is then returned to its initial position and the key withdrawn as before, when the disk O bearing against the hub of the pinion N (due to the action of the spring P) will receive in its notches $o$, the lugs $n$ of the pinion N, thus insuring the pinion and bolt against accidental movement and the wheel in its locked relation to the post.

Having thus described my invention, what I claim is:—

1. In a steering mechanism for vehicles, a steering post, a sleeve adapted to reciprocate on the post, a steering wheel adapted to rotate on the post, a clutch, the co-acting parts of which are respectively carried by the sleeve and steering wheel, means for forcing the clutch member carried by said reciprocating sleeve into co-acting relation with the clutch member carried by the wheel, and means adapted to secure the reciprocating portion of the clutch in a locked and an unlocked relation to said steering wheel clutch portion.

2. In a steering mechanism for vehicles, the combination of a steering post, a sleeve adapted to reciprocate on the post and keyed against rotation and having notched projections forming one member of a clutch, a steering wheel adapted to rotate on the post having a hub portion provided with notched projections forming the co-acting member of the clutch, means for moving the sleeve with its notched projections into locked or unlocked relation with the notched projections of the hub, and means for securing said reciprocating clutch in either a locked or unlocked relation to the hub.

3. In a steering mechanism for vehicles, a steering post, a sleeve adapted to reciprocate on the post, and keyed against rotation, and having notched projections forming one member of a clutch, said sleeve provided with a screw-threaded portion, a steering wheel adapted to rotate on the post having a hub portion provided with notched projections co-acting with the notched projections on the sleeve, a thimble loosely engaged with the hub and concentric with the sleeve having an internal screw-threaded portion co-acting with the screw-threaded portion of the sleeve, means for rotating said thimble to move the sleeve clutch member into locked or unlocked relation with the hub clutch member, and means for maintaining said last named parts in their locked or unlocked relation.

4. In a steering mechanism for vehicles, a steering post, a sleeve provided with a screw-threaded portion adapted to reciprocate on the post, and keyed against rotation, and having projections at one end forming one portion of a clutch, a steering wheel having a hub free to turn on the post, said hub portion provided with projections forming the opposing member of the clutch on the end of the sleeve, a thimble loosely engaged with the hub having an internal screw-threaded portion co-acting with the screw-threaded portion of the sleeve, a rotatable sleeve concentric with the thimble, means for locking said last named sleeve with the thimble, whereby upon manually rotating the sleeve, the thimble may be rotated and the clutch member carried by the first named sleeve forced into or withdrawn from co-acting relation with the clutch member carried by the hub, and means for maintaining said parts in their locked and unlocked relations.

5. In a steering mechanism for vehicles, a steering post, a sleeve provided with a screw-threaded portion adapted to reciprocate on the post and keyed against rotation, having on one end one member of a clutch, a steering wheel having a hub adapted to rotate on the post, said hub provided with the co-acting member of the clutch carried by the sleeve, a thimble loosely engaged with the hub having an internal screw-threaded portion co-acting with the screw-threaded portion of the sleeve, a rotatable sleeve concentric with the thimble, a reciprocating bolt carried by the rotatable sleeve, means for actuating said bolt, means coöperating with the bolt to lock the rotatable sleeve and thimble together, whereby upon manually rotating said sleeve the thimble may be rotated and thereby the clutch member on the reciprocating sleeve brought into locked or unlocked relation with the co-acting clutch member carried by the hub.

6. In a steering mechanism for vehicles, a steering post, a sleeve adapted for reciprocation on the post having a screw-threaded portion and notched projections forming one member of a clutch, a steering wheel rotatable on the post having a hub portion provided with notched projections forming the co-acting member of the clutch, a rotatable thimble loosely engaged with the hub of the wheel provided with an internal screw thread co-acting with the screw-threaded portion of the sleeve to force the clutch members into or out of operative relation, a rotatable sleeve concentric with the thimble, a reciprocating bolt carried by the rotatable sleeve having an aperture to receive a latch, and a spring actuated latch adapted to lock the thimble and rotatable sleeve together or the thimble and reciprocating sleeve against operation.

7. In a steering mechanism for vehicles, a steering post, a sleeve adapted for reciprocation on the post provided with one member of a clutch, a steering wheel rotatable on the post carrying the co-acting member of the clutch, means for reciprocating the sleeve whereby the clutch members may be brought into locked or unlocked relation, a bolt to secure the reciprocating sleeve in locked and unlocked relation with the wheel, a lock mechanism for actuating the bolt comprising a pinion operable by a key, adapted to mesh with a rack on the bolt, means for locking said pinion against accidental rotation, and a key adapted for rotating said pinion and to release the pinion locking means, whereby the pinion may be operated and the bolt reciprocated.

8. In a steering mechanism for vehicles, a steering post, a sleeve adapted for reciprocation on the post provided with one member of a clutch, a steering wheel rotatable on the post carrying the co-acting member of the clutch, means for reciprocating the sleeve whereby the clutch members may be brought into locked or unlocked relation, a bolt and co-acting latch to secure the reciprocating sleeve in locked and unlocked relation with the wheel, a lock mechanism for actuating the bolt comprising a pinion operable by a key, adapted to mesh with a rack on the bolt, means for locking said pinion against accidental rotation, a plurality of wards, and a key adapted to pass the several wards and to release the pinion locking means whereby the pinion may be operated and the bolt reciprocated.

9. In a device of the character described, a steering wheel carrying a clutch member, a reciprocating sleeve carrying a clutch member co-acting with the clutch member of the steering wheel, means for bringing them into interlocking and released relation, a reciprocating bolt having a rack, a co-acting latch to secure the parts when in locked or released relation, a key actuated pinion for reciprocating the bolt having projecting lugs adapted to be engaged by a co-acting disk to lock the pinion against accidental rotation, the disk keyed against rotation and notched to receive the lugs of the pinion, means for forcing said disk in yieldable relation to the pinion, and a key adapted to rotate the pinion and to release it from the engaging disk.

10. In a device of the character described, a steering wheel carrying a clutch member, a reciprocating sleeve carrying a clutch member co-acting with the clutch member of the steering wheel, means for bringing them into interlocking and released relation, a reciprocating bolt having a rack, a co-acting spring actuated latch adapted to enter an opening in the bolt to secure the parts when in locked or released relation, a key actuated pinion for reciprocating the bolt having projecting lugs adapted to be engaged by a co-acting disk to lock the pinion against accidental rotation, the disk keyed against rotation and notched to receive the lugs of the pinion, means for forcing said disk in yieldable relation to the pinion, and a key adapted to rotate the pinion and to release it from the engaging disk.

11. In a device of the class described, a steering wheel carrying a clutch member, a reciprocating sleeve carrying a clutch member provided with a screw-threaded portion and an opening to receive a locking latch, a thimble loosely engaged with the hub of the steering wheel having an internal screw-threaded portion co-acting with that of the reciprocating sleeve, a rotatable sleeve concentric with the thimble, a reciprocating bolt housed in the sleeve adapted to connect it with the thimble for joint operation, suitable lock mechanism for reciprocating the bolt, an annular hub secured to the end of the thimble adapted to receive the end of the bolt, and spring actuated latch supported in the hub adapted to enter an opening in the bolt and when forced back by the movement of the bolt to enter the opening in the reciprocating sleeve to lock the sleeve and thimble against further movement.

12. In a device of the class described, a steering wheel carrying a clutch member, a reciprocating sleeve carrying a clutch member provided with a screw-threaded portion and an opening to receive a locking latch, a thimble loosely engaged with the hub of the steering wheel having an internal screw-threaded portion co-acting with that of the reciprocating sleeve, a rotatable sleeve concentric with the thimble, a reciprocating bolt housed in the sleeve adapted to connect it with the thimble for joint operation, suitable lock mechanism for reciprocating the bolt, an annular hub secured to the end of the thimble adapted to receive the end of the bolt, a spring actuated latch supported in the hub adapted to enter an opening in the bolt and when forced back by the movement of the bolt to enter the opening in the reciprocating sleeve to lock the sleeve and thimble against further movement, and means adapted to indicate when said bolt and latch are in position to respectively coöperate.

13. In a steering mechanism for vehicles, a steering post, a sleeve adapted to reciprocate on the post, a steering wheel adapted to rotate on the post, a clutch the co-acting parts of which are respectively carried by the sleeve and steering wheel, means for forcing one of said clutch members into co-acting relation with the other, and a spring latch adapted to lock the clutch members respectively in a co-acting, and in a released relation to each other.

14. In a steering mechanism for vehicles, a steering post, a sleeve adapted to reciprocate on the post, a steering wheel adapted to rotate on the post, a clutch the co-acting parts of which are respectively carried by the sleeve and steering wheel, means for forcing one of said clutch members into co-acting relation with the other, a hub sleeved on the post, and a latch supported on the end of a spring secured to the hub adapted to lock the clutch members respectively in a co-acting and in a released relation to each other.

In testimony whereof, I sign this specification in the presence of two witnesses.

THEODORE D. STANLEY.

Witnesses:
   GRACE E. WYNKOOP,
   SAMUEL E. THOMAS.